United States Patent
Huaulme et al.

(10) Patent No.: US 11,801,728 B2
(45) Date of Patent: Oct. 31, 2023

(54) AIR CONDITIONING SYSTEM FOR AN ELECTRIC VEHICLE

(71) Applicant: Faiveley Transport Tours, Saint-Pierre-des-Corps (FR)

(72) Inventors: Patrice Huaulme, Tours (FR); Philippe Aubin, Chanceaux sur Choisille (FR); Domenico Palmisano, Marcq en Baroeu (FR)

(73) Assignee: FAIVELEY TRANSPORT TOURS, Saint-Pierre-des (FR)

( * ) Notice: Subject to any disclaimer, the term of this patent is extended or adjusted under 35 U.S.C. 154(b) by 230 days.

(21) Appl. No.: 16/915,687

(22) Filed: Jun. 29, 2020

(65) Prior Publication Data

US 2020/0324615 A1    Oct. 15, 2020

Related U.S. Application Data

(63) Continuation-in-part of application No. 15/599,574, filed on May 19, 2017, now Pat. No. 10,730,363.

(30) Foreign Application Priority Data

May 20, 2016   (FR) ...................................... 1654510

(51) Int. Cl.
| | |
|---|---|
| *B60H 1/00* | (2006.01) |
| *B60H 1/32* | (2006.01) |
| *B60H 1/22* | (2006.01) |

(52) U.S. Cl.
CPC ..... *B60H 1/00385* (2013.01); *B60H 1/00814* (2013.01); *B60H 1/2218* (2013.01); *B60H 2001/3269* (2013.01)

(58) Field of Classification Search
CPC .......... B60H 1/2218; B60H 2001/3269; B60H 1/00814; B60H 1/00385
See application file for complete search history.

(56) References Cited

U.S. PATENT DOCUMENTS

| | | | |
|---|---|---|---|
| 2016/0075350 A1* | 3/2016 | Becker | B61D 27/0072 701/19 |
| 2016/0264077 A1* | 9/2016 | Abousleiman | B60L 1/003 |

* cited by examiner

*Primary Examiner* — Schyler S Sanks
(74) *Attorney, Agent, or Firm* — Small Patent Law Group LLC; Christopher R. Carroll

(57) ABSTRACT

A system includes an actuator that produces heat or cold onboard an electric vehicle and a controller that generates an operating command to control the actuator to deliver a first average power over a predetermined time period based on one or more climatic conditions and based on a vehicle energy parameter. The vehicle energy parameter indicates whether (a) the electric vehicle or another electric vehicle is consuming electric energy or (b) the electric vehicle or another electric vehicle is producing the electric energy. The controller generates the operating command such that the first average power delivered by the actuator during the predetermined time period has substantially the same value as a second average power delivered by the actuator when the controller generates the operating command based only on the one or more climatic conditions.

12 Claims, 4 Drawing Sheets

AIR CONDITIONING SYSTEM FOR AN ELECTRIC VEHICLE

CROSS-REFERENCE TO RELATED APPLICATIONS

This application is a continuation-in-part of U.S. patent application Ser. No. 15/599,574, filed 19 May 2017, which claims priority to French patent application 1654510, filed 20 May 2016. The entire disclosures of these applications are incorporated herein by reference.

BACKGROUND

Technical Field

The subject matter described herein relates to an air conditioning system for an electric vehicle.

Discussion of Art

As electric transport networks are increasingly busy, the power networks supplying the vehicles can prove to be short of capacity during rush hours. It is therefore necessary to reduce the energy consumption in electric transport networks, in particular the consumption peaks.

Some items of equipment such as air conditioning systems consume a significant amount of electrical energy. An air conditioning system comprises a set of actuators and is configured in order to maintain climatic conditions in a passenger compartment. Generally, the actuators comprise among others, a compressor, a fan and heating elements, such as resistors or resistive elements. The actuators for producing heat or cold can consume significant amounts of electrical energy.

Climatic conditions are represented by a set of parameters, such as temperature, humidity, or air pollution. Thus, the air conditioning system is configured to maintain the parameters representing the climatic conditions at predetermined values. For example, the air conditioning systems are configured to maintain the temperature of the passenger compartment at a predetermined temperature or set temperature.

So as to maintain the parameters representing the climatic conditions at predetermined values, the air conditioning system comprises regulators that are configured to generate commands for operating the actuators as a function of a set of parameters representing climatic conditions in the interior and on the exterior of the passenger compartment. For example, regulating the temperature at a predetermined temperature value is implemented as a function of the temperature in the interior and on the exterior of the passenger compartment.

It will be noted that in the interior of a passenger compartment, the carbon dioxide ($CO_2$) level is linked to the number of people present in the passenger compartment. Thus, in some conventional air conditioning systems, the air renewal system must be dimensioned so that the air is renewed when the passenger compartment has a maximum occupancy level.

In a manner known in some air conditioning systems, the $CO_2$ level in the interior of the passenger compartment can also be taken into account so as to regulate the rate of air renewal in the interior of the passenger compartment and thus reduce the energy consumption of the air conditioning system, in particular when the occupancy level of the passenger compartment is low.

Thus, as a function of the parameters such as the temperature in the interior or on the exterior of the passenger compartment and optionally $CO_2$ levels in the air of the passenger compartment, the regulator for the air conditioning system generates operating commands applied to the different actuators constituting the air conditioning system. These operating commands are such that the actuators deliver an average power over a predetermined time period.

To reduce the electrical energy consumption in an electric transport vehicle, solutions exist consisting of recovering electrical energy in certain phases of the operation or modes of movement of the vehicle, to be used later in other phases of operation or modes of movement, in the same vehicle from which the energy is recovered or in another vehicle supplied by the same electrical supply network. During the braking phases of electric vehicles that are not equipped with energy recovery devices, rheostats connected to the motors of the vehicle dissipate the electrical energy generated by the motors of the vehicle in the form of heat. Thus, during this phase of operation, the electrical energy is recovered instead of being dissipated in the rheostats. For example, the energy recovered in the braking phases is used in the traction phases of the same vehicle from which the energy is recovered or in traction phases of another vehicle supplied by the same electrical supply network. According to energy recovery techniques, the air conditioning systems of a vehicle can be supplied by energy recovered during the braking phases of this same vehicle or of another vehicle supplied by the same electrical supply network.

BRIEF DESCRIPTION

In one embodiment, a system includes an actuator configured to produce heat or cold onboard a first electric vehicle. The system also includes a controller configured to generate an operating command to control the actuator to deliver a first average power over a predetermined time period based on one or more climatic conditions and based on a vehicle energy parameter. The vehicle energy parameter indicates whether (a) the first electric vehicle or another second electric vehicle is consuming electric energy to propel the first electric vehicle or the second electric vehicle or (b) the first electric vehicle or the second electric vehicle is producing the electric energy. The controller is configured to generate the operating command such that the first average power delivered by the actuator during the predetermined time period has substantially the same value as a second average power delivered by the actuator when the controller generates the operating command based only on the one or more climatic conditions.

In one embodiment, an electric vehicle includes an air conditioning system having an actuator configured to produce heat or cold. The vehicle also includes a controller configured to generate an operating command to control the actuator to deliver a first average power over a predetermined time period based on one or more climatic conditions and based on a vehicle energy parameter. The vehicle energy parameter indicates whether (a) the electric vehicle or another electric vehicle is consuming electric energy to propel the electric vehicle or the other electric vehicle or (b) the electric vehicle or the other electric vehicle is producing the electric energy. The controller is configured to generate the operating command such that a second average power delivered by the actuator during the predetermined time period has substantially the same value as when the controller generates the operating command based only on the one or more climatic conditions.

In one embodiment, a method includes determining one or more climatic conditions associated with a first electric vehicle, determining a vehicle energy parameter that is indicative of whether the first electric vehicle or a second electric vehicle is consuming or producing electric energy from an electrical supply network, and controlling an actuator that produces heat or cold onboard the first electric vehicle to deliver a first average power over a predetermined time period based on the one or more climatic conditions and the vehicle energy parameter. The actuator is controlled such that a second average power delivered by the actuator during the predetermined time period has substantially the same value as when the actuator is controlled based only on the one or more climatic conditions.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
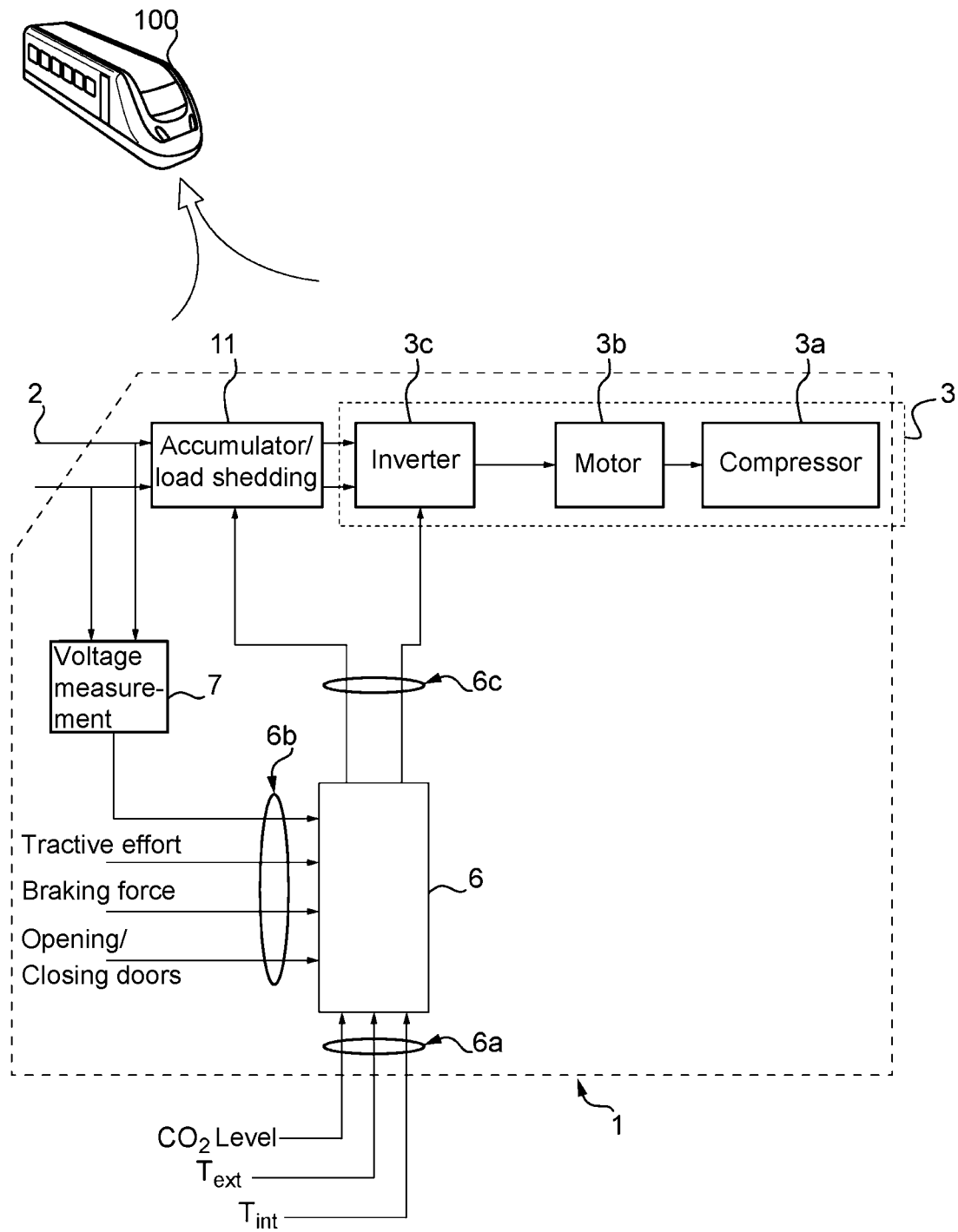
FIG. 1 illustrates one example of an air conditioning system.

One or more embodiments of the inventive subject matter described herein provide air conditioning systems that reduce energy consumption relative to some known air conditioning systems so as to reduce the energy consumption peaks of the air conditioning systems in electric vehicles.

The air conditioning system can be supplied by an electrical supply network and can include at least one actuator producing heat or cold and a controller configured to generate at least one operating command applied to the actuator as a function of parameter values representing climatic conditions. The actuator delivers an average power over a predetermined time period. The climatic conditions can include temperature, humidity, and/or emissions (e.g., air pollution).

The controller optionally can be referred to as a regulator, regulator device, or regulator means, and is configured to generate operating commands applied to the actuator also as a function of the parameter value that relates to at least one electric vehicle supplied by the electrical supply network. The parameter value can indicate that electrical energy is consumed by the electric vehicle, or that electrical energy is produced by the electric vehicle. The electric vehicle can be a transport vehicle (e.g., a bus or trolley), an automobile, a truck, a rail vehicle, a mining vehicle, an agricultural vehicle, or another off-highway vehicle. The operating command can be generated such that an average power delivered by the actuator over a predetermined time period has substantially the same value (or is smaller) as when the controller only considers the parameters representing the climatic conditions.

Thus, the controller can take the climatic conditions into account, as well as at least one parameter relating to at least one electric vehicle, for generating commands for operating the actuators of the air conditioning system of a vehicle.

The controller can take at least one parameter relating to the electric vehicle in which the air conditioning system is installed or relating to another electric vehicle supplied by the electrical supply network into account as well.

Thus, by these features, the operating commands are generated taking into account, in addition to parameter values representing the climatic conditions, the parameter value relating to at least one electric vehicle, without thereby modifying the value of the average power delivered by the actuator over the predetermined time period, with respect to the average power delivered by the actuator when only the parameter values representing the climatic conditions are taken into account.

The controller thus operates so as to maintain predefined climatic conditions (e.g., to maintain the parameter values representing the climatic conditions at predefined values), while taking into account at least one parameter relating to an electric vehicle.

This makes it possible to regulate the climatic conditions in a vehicle while reducing the peaks of electrical energy consumption. Thus, the electrical energy consumption is improved (e.g., by reducing the amount of energy consumed while maintaining designated, selected, or otherwise desired climatic conditions relative to one or more other air conditioning systems).

According to one example, over the predetermined time period, the one operating command can be generated such that, if during a first period A in which the parameter value indicates that the electrical energy is consumed by the electric vehicle, the average power delivered by the actuator during the first period A is less than the value of the average power during the predetermined time period when only the parameters representing the climatic conditions are taken into account for the generation of the operating command.

In the electric vehicles equipped with a device for the recovery of braking energy, when the parameter indicates that the electrical energy is consumed, the electric vehicle is in a traction phase (as one example). Thus, during the first period A, the power delivered by the actuator is reduced with respect to the value of the average power during the predetermined time period when only the parameters representing the climatic conditions are considered.

In one example, over the predetermined time period, the operating command can be generated such that, if during a second period B the parameter value indicates that electrical energy is produced by the electric transport, the average power delivered by the actuator during the second period B can be greater than the average power during the predetermined time period when only the parameters representing the climatic conditions for generation of the operating command are taken into account.

It will be noted that in electric vehicles equipped with a device for the recovery of braking energy, when the parameter indicates that electrical energy is produced, the electric vehicle is in a braking phase (as one example). Thus, during the second period B, the power delivered by the actuator can be increased with respect to the value of the average power during the predetermined time period when only the parameters representing the climatic conditions are considered.

The operating command applied to the actuator can include a control signal. During generation of the operating command, at least one parameter of the control signal can be modified as a function of the parameter value related to the electric vehicle.

Thus, by modifying at least one parameter of the control signal applied to the actuator, the instantaneous power delivered by the actuator can be modified while retaining the value of the average power over the predetermined time period. This parameter of the control signal can be an amplitude or a duration.

The controller can include a first regulator that is configured to generate at least one intermediate operating command as a function of at least one parameter representing climatic conditions, and a second regulator configured to modify said at least one intermediate operating command as a function of the parameter value relating to at least one electric vehicle and to generate the operating command applied to the actuator. Each of the regulators can represent hardware circuitry (the same or different, separate circuits) that includes and/or is connected with one or more processors (e.g., integrated circuits, field programmable gate arrays, microprocessors, etc.) that perform the functions associated with the corresponding regulator. Optionally, the controller can be a single regulator (formed from hardware circuitry that includes and/or is connected with one or more processors).

Thus, for equivalent climatic conditions, an operating command of an actuator (e.g., an intermediate operating command) generated by the first regulator can be modified such that the actuator can operate differently as a function of the parameter value relating to at least one electric vehicle.

The energy consumption can be represented by the parameter value relating to the electric vehicle, with this value being different as a function of the mode of movement of the electric vehicle. Thus, by considering the parameter value relating to at least one electric vehicle, account is taken of the energy consumption of the mode of movement.

Moreover, the second regulator can be added (e.g., retrofit) to a pre-existing air conditioning system (e.g., that already includes the first regulator), thus making it possible to obtain an air conditioning system with improved consumption relative to the air conditioning system without the second regulator.

The air conditioning system optionally can include an energy storage device configured to store electrical energy responsive to the parameter value relating to the electric vehicle indicates that electrical energy is produced by the electric vehicle (e.g., by regenerative braking). For example, when the vehicle is in the braking mode, the generated energy is stored in the energy storage device and can be reused later. The energy storage device can include one or more batteries, other capacitors, flywheels, etc.

The air conditioning system also can include a load shedding apparatus (such as a contactor) that disconnects the air conditioning system from the electrical supply network responsive to the parameter value relating to the electric vehicle indicating that the electric vehicle is consuming electrical energy, such as when the vehicle is operating in a traction phase (e.g., generating tractive effort to propel the vehicle). Thus, for example, while the vehicle is in the traction phase or traction mode, as the energy consumption in this mode is high, the electrical energy consumed by the air conditioning system is zero or reduced and the energy consumption peaks are reduced.

The parameter value relating to the electric vehicle can include a value of one or more of electrical power consumed by the vehicle, a tractive effort generated by the vehicle, a braking force generated by the vehicle, a distance traveled by the vehicle or to be traveled by the vehicle, a moving speed of the vehicle, an acceleration of the vehicle, an open or closed state of doors of the vehicle, and/or a voltage of the power network supplying the electric vehicle.

Optionally, the parameter relating to the electric vehicle can relate to the electric vehicle having the air conditioning system.

The parameter relating to the electric vehicle can relate to at least one electric vehicle different from the electric vehicle that includes the air conditioning system.

The parameter relating to at least one electric vehicle can relate to several electric vehicles supplied by the electrical supply network.

Thus, according to different embodiments, the electric vehicle comprising the air conditioning system forms part of or does not form part of the several electric vehicles.

An electric vehicle supplied by an electrical supply network can include an air conditioning system having a controller configured to generate at least one operating command applied to at least one actuator for production of heat or cold as a function of the parameter value relating to at least one electric vehicle supplied by the electrical supply network. The parameter value indicates that electrical energy is consumed by the electric vehicle, or that the electrical energy is produced by the electric vehicle. The operating command can be generated such that the average power delivered by the actuator over the predetermined time period has substantially the same value (or less) as when the controller only considers the parameters representing the climatic conditions. The average power can have substantially the same value when the average power does not vary or change by more than 1%, by more than 3%, or by more than 5% (in different embodiments) during the entire predetermined time period.

The electric vehicle also includes energy storage assemblies or device(s) to store electrical energy when the parameter value indicates production of electrical energy by the vehicle.

The electric vehicle also includes load shedding apparatuses or device(s) configured to disconnect the air conditioning system from the electrical supply network responsive to the parameter value for the electric vehicle indicates electrical energy consumption by the electric vehicle.

The parameter relating to the electric vehicle can relate to the same vehicle that includes the air conditioning system, may relate to another electric vehicle, or may relate to several electric vehicles powered by the supply network.

A method for regulating parameters representing climatic conditions to predefined values in an electric vehicle supplied by an electrical supply network also is provided. The method includes generating at least one operating command applied to at least one actuator for the production of heat or cold of an air conditioning system as a function of parameter values representing the climatic conditions. The actuator delivers an average power over a predetermined time period.

The generation of the operating command applied to the actuator also can consider (e.g., can be based on) the parameter value relating to at least one electric vehicle supplied by the electrical supply network. The parameter value can indicate that the electrical energy is consumed by at least one electric vehicle, or that electrical energy is produced by at least one electric vehicle. The operating command can be generated such that the average power delivered by the actuator over the predetermined time period has substantially the same value as when the generation takes into account only the parameters representing the climatic conditions. For example, the air conditioning system can be controlled such that the average power delivered by the actuator is the same regardless of whether the electric vehicle is consuming or producing electric energy from the supply network (apart or in addition to the energy consumed by the air conditioning system).

In one example, over the predetermined time period, the operating command can be generated such that, if during a first period A in which the parameter value indicates that electrical energy is consumed by the at least one electric vehicle, the average power delivered by the actuator during the first period A can be less than the value of the average power during the predetermined time period when only the parameters representing climatic conditions are taken into account for generating the operating command.

Optionally, over the predetermined time period, the operating command can be generated such that, if during a second period B the value for the parameter indicates that electrical energy is produced by at least one electric vehicle, the average power delivered by the actuator during the second period B can be greater than the value of the average power during the predetermined time period when only the parameters representing the climatic conditions are considered for generation of the operating command.

The operating command applied to the actuator can include a control signal, where at least one parameter of the control signal is modified as a function of the value for the representative parameter of an electric vehicle during the generation of the operating command applied to the actuator. The parameter of the control signal can be an amplitude and/or a duration of the control signal.

The generation of the operating command can include generating at least one intermediate operating command as a function of at least one parameter representing climatic conditions and modifying the intermediate operating command(s) as a function of the parameter value relating to at least one electric vehicle to generate the at least one operating command applied to the actuator.

The regulating method also can include generating a control signal for storage of electrical energy responsive to the parameter value relating to at least one electric vehicle indicates the production of electrical energy by the at least one electric vehicle.

The regulating method also can include generating a control signal for disconnecting the air conditioning system from an electrical supply network responsive to the parameter value relating to at least one electric vehicle indicates electrical energy consumption by the at least one electric vehicle.

FIG. 1 illustrates one example of an air conditioning system. The electric vehicles described herein can include urban electric transport vehicles, such as for example underground trains or trams, trolleybuses, etc. Optionally, the electric vehicles can include other electric vehicles, such as automobiles, trucks, other buses, mining vehicles, rail vehicles, or the like. The air conditioning system 1 is mounted in an electric vehicle 100. The electric transport vehicle 100 is supplied by an electrical supply network 2. For example, the vehicle 100 can be powered by an overhead catenary, an electrified rail, or the like. The air conditioning system 1 comprises at least one actuator such as a compressor, fans, heating resistors, etc. In one example, the actuator is a compressor 3a controlled by a motor 3b powered by a variable-frequency inverter 3c. The actuator 3 can produce heat or cold (for example in air conditioning systems known as "reversible").

The air conditioning system 1 also comprises a controller 6 that generates operating commands of the actuators 6c, such as a command controlling the speed of the motor 3b controlling the compressor 3a. The operating commands of the actuators 6c can include other commands not shown in the figures, such as commands controlling the speed of the fans, the connection or disconnection of the heating resistances, etc. Thus, the operating commands of the actuators 6c can be output signals of the controller 6.

The controller 6 receives, as input, a first set of parameters representing the climatic conditions 6a and a second set of parameters relating to at least one electric vehicle 6b. The value for the parameter relating to the vehicle indicates whether the electrical energy is consumed by the vehicle, or whether electrical energy is produced by the vehicle. The parameter relating to the vehicle can be referred to as a vehicle energy parameter.

The vehicle energy parameter can be associated with the electric vehicle on which the air conditioning system 1 is mounted, may be associated with another, second electric vehicle supplied by the same electrical supply network 2 that supplies electric energy (e.g., current) to the electric vehicle in which the air conditioning system is disposed), or to several electric vehicles supplied by the same electrical supply network 2.

The value of the vehicle energy parameter can be a function of actions relating to the driving of the vehicle, such as propulsion-generation or electric braking. Thus, a parameter representing a driving-related action can be generation of a tractive effort by the vehicle or a regenerative electrical braking effort, with the value of the parameter representing the level, amount, or magnitude of tractive effort or electrical braking effort. Optionally, the value of the parameter can indicate the amount of current generated by regenerative braking.

For example, the vehicle energy parameter can have a value of electrical power consumed or generated by the vehicle. The vehicle energy parameter optionally may have a value of tractive force or braking force generated by the vehicle. As another example, the vehicle energy parameter can have a value of a distance that the vehicle has moved or needs to move to complete a trip, a distance that the vehicle has been generating tractive effort, and/or a distance that the vehicle has been generating current via regenerative braking. The vehicle energy parameter can have a value of the moving speed or acceleration of the vehicle.

Additional examples of the vehicle energy parameter can include values that indicate whether doors of the vehicle are open or closed (which can indicate whether the vehicle is moving or stationary as the opening and the closing of the doors may be controlled while the vehicle is stopped). The vehicle energy parameter can include a value for a voltage supplied to the vehicle from the electrical supply network 2.

The electric vehicle can be equipped with a device for the recovery of braking energy, supplied by an electrical supply network brakes by traction motors (the driving-related action being a braking action). This can allow the vehicle to direct voltage obtained from regenerative braking to the electrical supply network 2. In contrast, when at least one electric vehicle supplied by the electrical supply network 2 exerts a tractive effort (the driving-related action being traction), the value for the voltage of the electrical supply network increases.

In the embodiment shown, the parameters relating to at least one vehicle 6b comprise a tractive effort, a braking effort, a value representing an open or closed state of the doors, and the measured voltage of the electrical supply network 2. Optionally, a subset of one or more (but not all) of these parameters may be used as the vehicle energy parameter.

In the illustrated embodiment, the set of parameters representing the climatic conditions 6a includes the temperature in the interior of the vehicle, the temperature outside of the vehicle, and the $CO_2$ level. Other parameters may be used, such as humidity. The controller 6 generates the operating commands 6c applied to the actuators as one or more functions of (a) the values of the parameters representing climatic conditions 6b, (b) the value for a parameter relating to at least one electric transport vehicle supplied by the electrical supply network 2, (c) the value for the parameter indicating that electrical energy is consumed by the electric vehicle, or (d) that electrical energy is produced by the electric vehicle.

The operating commands 6c applied to the actuators 3 are generated such that at least one of the parameters representing the climatic conditions is maintained at a predefined value (e.g., a user-selected or pre-set value), while taking into account the value for at least one parameter relating to at least one electric vehicle 6b supplied by the electrical supply network 2.

As will be described below, the operating command applied to said at least one actuator 3 is generated such that the average power delivered by the actuator 3 over a predetermined time period has substantially the same value as when the controller 6 only considers the parameters representing the climatic conditions 6a. In the embodiment depicted in FIG. 1, the air conditioning system also comprises a voltage sensor 7 that measures voltage supplied by the electrical supply network 2, so as to generate, at the input of the controller 6, a value for a parameter relating to at least one electric vehicle supplied by the electrical supply network 2.

Figure 2:
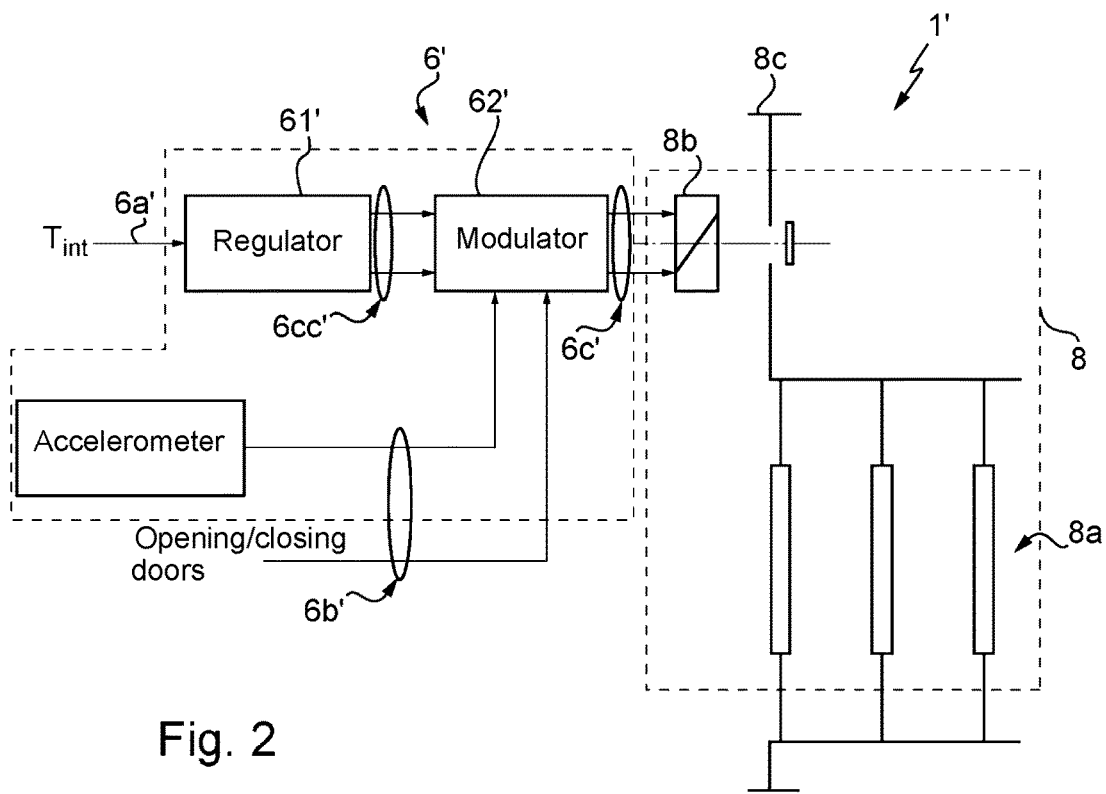
FIG. 2 illustrates another example of an air conditioning system.

FIG. 2 illustrates another example of an air conditioning system for an electric vehicle. As will be explained, this embodiment is suitable for adapting a conventional air conditioning system so as to obtain an air conditioning system 1' according to the inventive subject matter. As for the embodiment represented by FIG. 1, a single actuator 8 is shown. In the embodiment shown, the actuator itself is a set of heating resistances 8a, these heating resistances being actuators producing heat. The set of heating resistances 8a is connected to a contactor 8b. The contactor 8b alternates between closed and open states or positions to connect or not connect the set of heating resistances 8a to a supply 8c. The contactor 8b is controlled by operating commands 6c. The air conditioning system 1' can include other actuators, not shown in the figure.

In an embodiment, the controller 6' can include a first regulating module 61' and a second regulating module 62'. Each module can represent the same or separate hardware circuitry that includes and/or is connected with the same or different processor(s) for carrying out the functions described in connection with the respective module. The first regulating module 61' can generate intermediate operating commands 6ci' of the actuators as a function of at least one parameter representing the climatic conditions 6a'.

In the embodiment shown, a parameter representing the climatic conditions 6a' is the temperature in the interior of the vehicle. Thus, the first regulating module 61' generates intermediate operating commands 6ci' of the actuators as a function of the temperature in the interior of the vehicle in which the air conditioning system 1' is mounted.

The second regulating module 62' is configured to modify the intermediate operating commands 6ci' applied to the actuators 8 as a function of the value for at least one parameter relating to at least one electric transport vehicle 6b' and to generate the at least one operating command 6c' applied to the at least one actuator 8.

The intermediate operating commands 6ci' of the actuators 8 are modulated as a function of the value for at least one parameter relating to at least one electric transport vehicle 6b', so as to generate at the output operating commands 6c' applied to the actuators 8 or operating commands 6c' applied to the modulated actuators.

The second regulating module 62' receives, at the input, the intermediate operating commands 6ci' applied to the actuators 8, as a function of the value for at least one parameter relating to at least one electric transport vehicle 6b'.

In the embodiment shown, the parameters relating to at least one electric transport vehicle 6b' are an acceleration of the vehicle and a value representing an open or closed state of the doors. The acceleration of the vehicle can originate from an accelerometer or other sensor. It will be noted that the acceleration information originating from an accelerometer does not make it possible to know whether the electric transport vehicle is braking or accelerating when this vehicle can move in either direction (e.g., the vehicle has a driver's cab at each end).

Thus, the additional information relating to the opening or closing of the doors makes it possible for the second regulating module 62' to know whether the vehicle is accelerating or braking, as the vehicle can only accelerate after the doors have been closed.

In this embodiment, the first regulating module 61' is configured to generate intermediate operating commands 6ci' applied to the actuators 8 as a function of the temperature in the interior of the vehicle in which the air conditioning system 1' is installed, and the second regulating module 62' is configured to modify the intermediate operating commands 6ci' applied to the actuators 8 as a function of the values of the parameters relating to an electric transport vehicle 6b', the values being an acceleration of the vehicle in which the air conditioning system 1' is installed and a value representing an open or closed state of the doors of the electric transport vehicle.

In the embodiment shown, the operating commands applied to the actuators 6c' control the connection or the disconnection of the heating resistances 8a to a supply 8c by means of a contactor 8b.

The air conditioning system according to the invention 1, 1' implements a method for regulating the parameters representing climatic conditions to predefined values in an electric transport vehicle.

Figure 3:
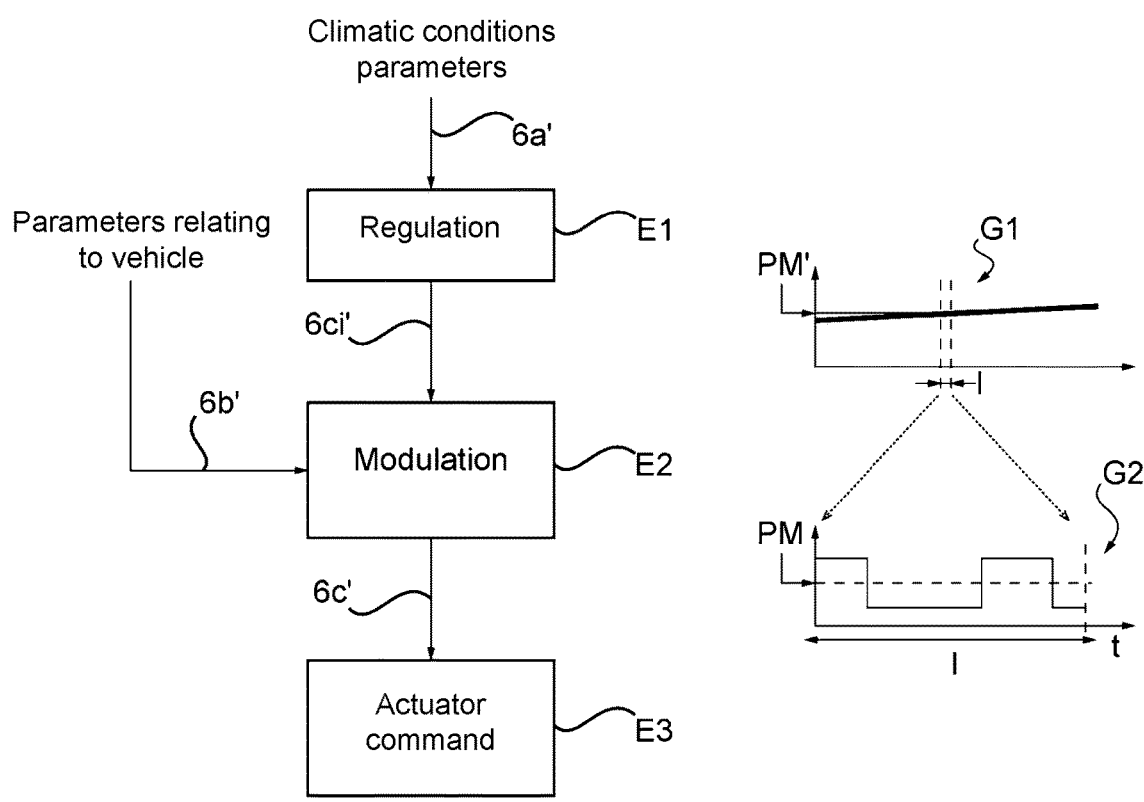
FIG. 3 illustrates a flowchart of one example a regulating method.

A method for regulating the parameters representing climatic conditions to predefined values according to an embodiment is shown in FIG. 3. The method comprises generating E1 at least one operating command applied to said at least one actuator 3, 8 of an air conditioning system as a function of values for parameters representing the climatic conditions 6a, 6a', said at least one actuator 3, 8 delivering an average power over a predetermined time period I.

Generating E2, E3 said at least one operating command applied to said at least one actuator also considers the value for a parameter relating to at least one electric transport vehicle 6 b, 6 b' supplied by said electrical supply network 2. The value for the parameter indicates that the electrical energy is consumed by said at least one electric transport vehicle, or that electrical energy is produced by said at least one electric vehicle.

The at least one operating command 6c, 6c' is generated such that the average power PM delivered by said at least one actuator 3, 8 over said predetermined time period has substantially the same value PM' as when the controller 6, 6' only considers the parameters representing the climatic conditions.

In the mode shown in FIG. 3, the method corresponds to an air conditioning system represented by FIG. 2 (e.g., with the controller formed by a first controller 61' and a second controller 62'). It will thus be noted that steps E1 and E2 are grouped together in a single step for the embodiment shown in FIG. 1. The method shown comprises an operation E1 of generating intermediate operating commands 6ci' of the actuators as a function of at least one parameter representing climatic conditions 6 a'.

This generating operation E1 corresponds to a conventional climatic regulation. The method also comprises an operation E2 of modifying intermediate operating commands 6ci' of the actuators generated in the generation operation E1, this modification being implemented as a function of the value for at least one parameter relating to at least one electric transport vehicle 6 b' such that, over a predetermined time period, the average power PM delivered by at least one actuator 8 has substantially the same value PM' as when the intermediate operating commands 6ci' are sent directly to the actuators so as to control their operation, taking into account only the parameters representing the climatic conditions 6 a'. Operating commands applied to the actuators 6c' are thus generated at the output of modification operation E2.

The operating commands of the actuators 6c' are sent to the actuators 8 so as to control operation of the actuators 8 during a step of controlling the actuators E3. Each operating command of an actuator 6c' comprises a control signal representing a value. The control signal can be for example an electrical signal, such as an analogue, digital or logic signal.

During the modification E2 of the operating command, at least one parameter of the control signal is modified as a function of the value for the representative parameter of an electric transport vehicle. For example, the parameter of the control signal can be an amplitude or a duration.

FIG. 3 shows graphs representing a control signal. A first graph G1 represents a control signal or intermediate operating command 6ci' indicating the power to be delivered by an actuator 8. During the generation operation E1, a control signal to be applied to an actuator 8 is generated, the actuator 8 delivering an average power PM' over a predetermined time period I. A second graph G2 represents the control signal or operating command 6c' applied to an actuator 8 indicating the power to be delivered by an actuator 8.

During the modification operation E2, the control signal generated during the generating step E1 is modified and generated such that the average power PM over the predetermined time period I is substantially identical to the value for an average power PM' of the control signal generated during the generating operation E1.

Figure 4:
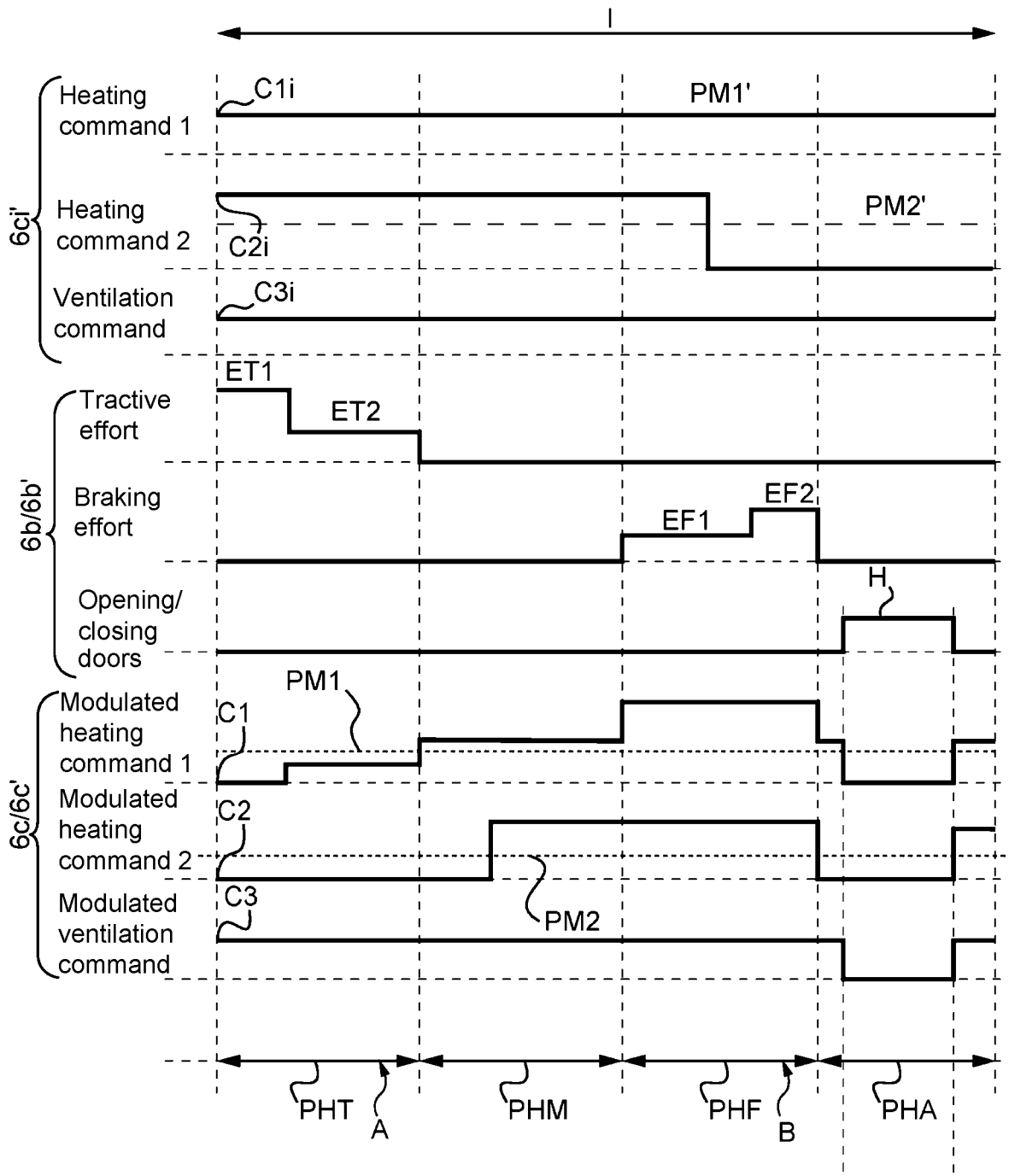
FIG. 4 illustrates one example of control signals generated by air conditioning systems over time.
Figure 5:
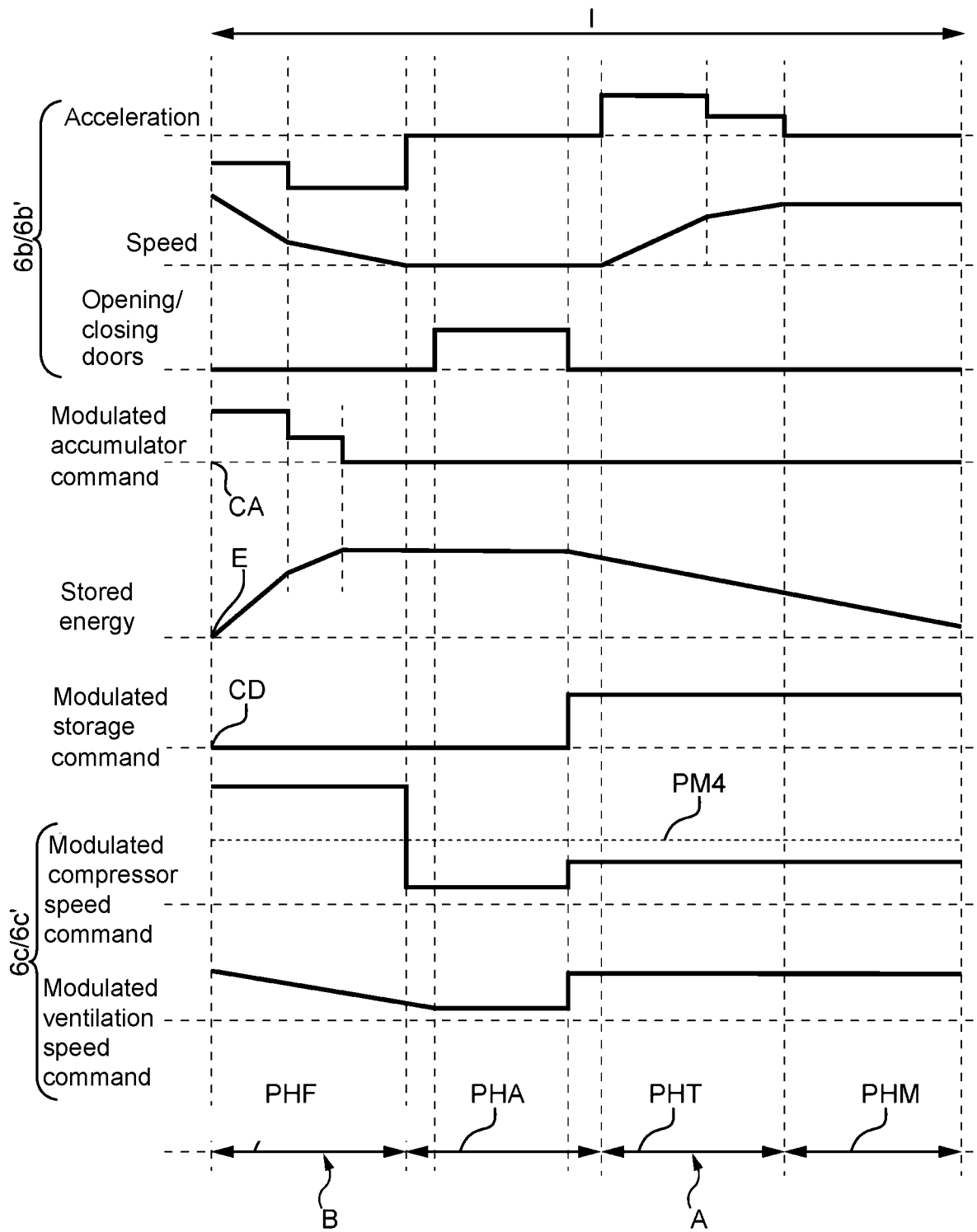
FIG. 5 illustrates an additional example of control signals generated by air conditioning systems over time.

FIGS. 4 and 5 show the development over time of the operating commands 6c, 6c' of the actuators 3, 8 generated in the air conditioning systems 1, 1' according to two different embodiments.

FIG. 4 shows a first group of signals representing intermediate operating commands 6ci' of the actuators generated as a function of at least one parameter representing climatic conditions 6 a, 6 a'. Here, the parameter representing climatic conditions is the temperature in the interior of a passenger compartment of the electric transport vehicle, and the actuators producing heat comprise heating resistances 8.

FIG. 4 shows two types of operating command of the heating resistances. A first operating command of the heating resistances is represented by a control signal C1 representing a heating power value. A second operating command of the heating resistances is represented by a second control signal C2, this control signal being a logic signal (e.g., as a function of the level or state of this control signal 2), the heating resistances are connected to the supply voltage 2, or the resistances are disconnected from the supply voltage. In the embodiment shown, the control signal C2 is capable of representing only 2 heating power values (full power, zero power).

A third control signal C3 represents the operating command of the fans. In this example, the signal is a logic signal. The control signals have been shown as a function of time t. The driving of the vehicle (not shown) develops as a function of time t; several driving phases are represented. During a driving phase, actions relating to the driving of the vehicle are implemented.

As a function of the action relating to the driving of the vehicle, the electric transport vehicle consumes or produces electrical energy. Thus, a traction phase PHT, a freewheeling phase PHM, a braking phase PHF and a stop phase PHA are shown. In the example shown, these phases form a predetermined time period I. In the predetermined time period I, the number of each of these phases and the order or the phases may be different.

In FIG. 4, four actions relating to the driving of the vehicle are shown, a first action being traction (traction phase PHT), a second action being freewheeling (freewheeling phase PHM), a third action being braking (braking phase PHF), and a fourth action being stopping (stop phase PHA). The values for parameters relating to at least one electric transport vehicle are a function of the phase in which the electric transport vehicle is situated. In the embodiment shown, a value for a tractive force, an electric braking force, and a value representing an open or closed state of the doors are represented. Of course, other parameters relating to at least one electric transport vehicle can be considered. These parameters can comprise: a value for electrical power, or a tractive force, or a braking force, or a distance, or a speed, or an acceleration; a value representing an open or closed state of the doors of an electric transport vehicle; and/or a value for a voltage of the power network supplying at least one electric transport vehicle.

Thus, as shown in FIG. 4, the value for the tractive force or effort has a first value ET1 (for example 100% of the maximum value) and a second value ET2 (for example 50%) during the traction phase PHT, the value for these parameters being zero during the other phases represented. Similarly, the value for the force or the braking effort has a first value EF1 (for example 50%) and a second value EF2 (for example 100%) during the braking phase, the value for the electrical braking effort being zero during the other driving phases represented.

As the value representing the opening or closing of the doors is a binary logic signal, it has a low level when opening of the doors is not commanded or the doors are closed (this being the case during the phases of traction PHT, freewheeling PHM and braking PHF) and a high level H representing the opening of the doors (opening of the doors being commanded when the vehicle is stopped). For example, the value for the parameter relating to at least one electric transport vehicle 6b' indicates that electrical energy is consumed during the traction phase PHT or first period A and indicates that energy is produced during the braking phase PHF or second phase B. During the stop phase PHA or freewheeling phase PHM, energy is neither consumed nor produced.

FIG. 4 shows a third group comprising operating commands of the actuators 6c'. These commands 6c' are generated in the modification step E2 of the regulating method. A first operating command C1 is generated by modifying the operating command of the heating resistance Cli (intermediate operating command). A second operating command of the heating module C2 is generated by modifying the operating command of the heating module C2i (intermediate operating command). A third operating command of the ventilation module C3 is generated by modifying the operating command of the ventilation module C3i (intermediate operating command).

The operating commands are represented by command signals C1, C2, C3. The value for each control signal C1, C2 represents a power set point or power value delivered by the actuator 3, 8. It is such that the value of the average power set point value PM1, PM2 represented by this signal over a predetermined time period I is substantially equal to the value of the average power set point or average power delivered by the actuator PM1', PM2' of the intermediate control signal C1 i, C2 i generated by the first regulating module (shown in FIG. 2).

In an air conditioning system such as that shown in FIG. 1, the controller 6 send a speed value 6c (the control signal being a speed) to the inverter 3c. The inverter 3c delivers, as a function of the speed value 6c received, power control signals of the motor 3b so that it can run at the required speed. The motor 3b, running at the requested speed, drives the compressor 3a, the compressor 3 a thus delivering a given power value.

As a result, the value for each control signal 6c represents a power set point or power value delivered by the actuator 3. For example, the values for PM1 and PM1' are 40% of the maximum value and those for PM2 and PM2' are 60% (but alternatively may have other values). In this embodiment, the predetermined time period I corresponds to the sum of the time periods associated with each of the driving phases corresponding to a journey between two stations. By way of example, the traction phase PHT, freewheeling phase PHM, braking phase PHF and stop phase PHA have the same duration of 30s. This duration value can be different, and the durations of the phases can be different from each other.

Thus, during the traction phase PHT, the control signal of the heating module C1 is generated from the first intermediate control signal Cli, of the heating module, this intermediate control signal Cli being modulated by the value for the tractive effort in this example. It will be noted that the value for the tractive effort is a value for a parameter relating to an electric transport vehicle. Thus, when the tractive effort has its maximum value ET1, the control signal of the heating resistance C1 or modulated control signal of the heating resistance C1 has a zero value, and when the value for the tractive effort has the second value ET2, the modulated control signal C1 has a value greater than 0 and less than the average power set point value PM1' over the predetermined time period I.

During the freewheeling phase PHM in which the value for the tractive effort is zero, the value represented by the modulated control signal C1 has a value greater than the value of the average power set point PM1 over the predetermined time period I. During the braking phase, during which the tractive effort is zero, the value for the modulated control signal C1 has its upper value, this value reducing when the vehicle is stopped, and being zero when the command for opening the doors is activated.

The average value PM1 of the control signal C1 representing the operating command of the heating is substantially equal to the value of the average power set point PM1' of the intermediate control signal C1 i of the heating generated by the first regulating module 61' over the predetermined time period I.

The second modulated control signal of the heating C2 is modified with respect to the second intermediate heating control signal C2 i such that it has a low level during the traction phase PHT and a part of the stop phase PHA and the freewheeling phase PHM and a high level during the braking phase PHF as well as during a part of the freewheeling phase PHM and during the stop phase PHA after the closing of the doors.

The value of the average power set point PM2 of the control signal C2 representing the operating command of the heating is substantially equal to the average value PM2' of the intermediate control signal C2 i of the heating generated by the first regulating module over the predetermined time period I.

As a result, when the parameters relating to at least one electric transport vehicle 6b' have a value indicating the consumption of electrical energy (due for example to the traction of the vehicle), the second regulating module 62' is configured in order to inhibit at least one of the operating commands 6ci' of the actuators generated by the first regulating module 61 or to reduce the value of the signal representing the operating command.

On the other hand, when the parameters relating to at least one electric transport vehicle have a value indicating the production of electrical energy (due for example to braking of the vehicle), the second regulating module 62' is configured in order not to modify the operating commands 6ci' generated by the first regulating module 61' or to increase the value of the control signal representing the operating command.

To reduce heat losses when the doors of the electric transport vehicle are open, the modulated ventilation control signal C3 has a high level throughout the predetermined time period I except when the door opening command is given.

FIG. 5 shows control signals according to another embodiment. A first group of signals representing the value for the parameters relating to at least one electric transport vehicle 6 b is shown. In this example, the parameters are the acceleration of the vehicle, the speed of the vehicle, as well as a value representing an open or closed state of the doors.

A second group of control signals 6c, 6c' comprises an operating command of the compressor or modulated control signal of the compressor, and the operating command of the ventilator or modulated control signal of the ventilator.

A third group of signals comprises a control signal CA of the energy storage assembly, a signal E representing the energy stored in the energy storage assembly, and a third signal CD representing a control signal of the load shedding devices. The values of the control signals shown change over time t.

In this embodiment, a first braking phase PHF is shown, followed by a stop phase PHA, a traction phase PHT and a freewheeling phase PHM. As for FIG. 4, the order and the duration of the phases may be different from those shown. The values of the parameters relating to at least one electric transport vehicle 6 b vary as a function of the driving phase of the vehicle. These values are considered when the modulated control signals are generated.

For example, the value for the parameter relating to at least one electric transport vehicle 6*b* indicates that electrical energy is consumed during the traction phase PHT or first period A and indicates that energy is produced during the braking phase PHF or second phase B. The predetermined time period I can comprise several first periods A or several second periods B. During the stop phase PHA or freewheeling phase PHM, energy is neither consumed nor produced.

Thus, as shown in FIG. 5, the modulated control signal of the compressor (representing the operating command of the compressor) has a first value during the braking phase, a second value (less than the first value) during the stop phase and a third value (greater than the first value and less than the second value) during the traction phase PHT and the freewheeling phase PHM. These values are determined such that the value of the average power set point or value of the average power PM4 delivered by the compressor during the predetermined time period I is substantially equal to the average value for a control signal (not shown) generated, only taking into account the parameters representing the climatic conditions.

In the example shown in FIG. 5, to reduce heat losses when the doors are open, the modulated control signal of the ventilator has values reducing during the braking phase PHF to a minimum ventilation value when the doors are open during the stop phase PHA, and a return to the normal ventilation value during the traction phase PHT and freewheeling phase PHM.

In an embodiment (FIG. 1), the air conditioning system also includes an energy storage assembly 11 that stores electrical energy from the electrical supply network 2 as a function of the value for the parameter relating to at least one electric transport vehicle or electric transport vehicles supplied by the same electrical supply network 2. The energy storage assembly 11 can represent one or more batteries, capacitors, flywheels, or the like.

In other embodiments, the energy storage assembly and/or the load shedding devices are situated in the electric transport vehicle outside the air conditioning system 1, 1'. The air conditioning system can also comprise one or more load shedding devices 11 that disconnect the air conditioning system 1, 1' from the electrical supply network 2.

In this embodiment, the regulating method comprises generating a control signal CA for the storage of electrical energy from the electrical supply network 2 as a function of the value for the parameter relating to at least one electric transport vehicle.

The method can also comprise generating a command for the disconnection of the air conditioning system 1, 1' from the electrical supply network 2.

The control signal for the electrical energy storage CA shown in FIG. 5 has values that consider the value for the parameters representing an action relating to the driving of the vehicle. Thus, during the braking phase PHF, the control signal for the energy storage CA has positive values indicating the activation of the energy storage the height of which matches those for deceleration. Once the full charge is reached or the vehicle passes into the stop phase PHA, the control signal for the electrical energy storage CA has a zero value, deactivating the energy storage.

The energy curve E represents an increase in energy stored in the storage assembly during the braking phase PHF, the energy remaining stable during the stop phase PHA, and reducing during the phases of traction PHT and freewheeling PHM.

The control signal CD for disconnecting the air conditioning system 1, 1' from the electrical supply network has a level of zero when the vehicle is in a braking phase PHF and in a stop phase PHA until the doors are closed. Thus, the air conditioning system is supplied by the electrical supply network 2. The disconnection control signal CD has a high level as from closure of the doors in the stop phase PHA and when the vehicle is in a traction phase PHT or in a freewheeling phase PHM. From then on, the air conditioning system is no longer supplied by the electrical supply network 2 but by the storage assembly.

It will be noted that in an embodiment, a parameter relating to at least one electric transport vehicle relates to at least the electric transport vehicle comprising the air conditioning system.

In another embodiment, a parameter relating to at least one electric transport vehicle relates to at least one electric transport vehicle different from the electric transport vehicle comprising the air conditioning system. In this embodiment, the parameter relating to at least one electric transport vehicle relates to several electric transport vehicles supplied by the electrical supply network.

In one embodiment, a system includes an actuator configured to produce heat or cold onboard a first electric vehicle. The system also includes a controller configured to generate an operating command to control the actuator to deliver a first average power over a predetermined time period based on one or more climatic conditions and based on a vehicle energy parameter. The vehicle energy parameter indicates whether (a) the first electric vehicle or another second electric vehicle is consuming electric energy to propel the first electric vehicle or the second electric vehicle or (b) the first electric vehicle or the second electric vehicle is producing the electric energy. The controller is configured to generate the operating command such that the first average power delivered by the actuator during the predetermined time period has substantially the same value as a second average power delivered by the actuator when the controller generates the operating command based only on the one or more climatic conditions.

Optionally, while the vehicle energy parameter indicates that the first electric vehicle or the second electric vehicle is consuming the electric energy to propel the first electric vehicle or the second electric vehicle, the controller can be configured to generate the operating command such that the first average power delivered by the actuator during the predetermined time period is less than the second average power delivered by the actuator when the controller generates the operating command based only on the one or more climatic conditions.

Optionally, while the vehicle energy parameter indicates that the first electric vehicle or the second electric vehicle is producing the electric energy, the controller is configured to generate the operating command such that the first average power delivered by the actuator is greater than the second average power delivered by the actuator when the controller generates the operating command based only on the one or more climatic conditions.

Optionally, the controller is configured to generate a control signal representative of the operating command and for sending to the actuator. The controller can be configured to modify one or more of an amplitude or a duration of the control signal based on the vehicle energy parameter.

Optionally, the controller is configured to generate an intermediate command as a function of the one or more climatic conditions. The controller also can be configured to modify the intermediate command based on the vehicle energy parameter.

Optionally, the system also includes an energy storage assembly configured to store the electric energy produced by the first electric vehicle.

Optionally, the system also includes a load shedding apparatus configured to disconnect the actuator from an electrical supply network that provides the electric energy used by the first electric vehicle or the second electric vehicle. The load shedding apparatus can be configured to disconnect the actuator from the electrical supply network responsive to the controller determining that the first electric vehicle is consuming the electric energy from the electrical supply network.

Optionally, the controller is configured to determine whether the first electric vehicle is consuming the electric energy or producing the electric energy based on an open state or a closed state of a door of the first electric vehicle.

Optionally, the vehicle energy parameter indicates whether the second electric vehicle is consuming the electric energy.

Optionally, the vehicle energy parameter indicates whether the second electric vehicle and at least one additional electric vehicle other than the first electric vehicle are consuming the electric energy.

Optionally, the vehicle energy parameter includes a value indicative of one or more of electrical power consumed by the first electric vehicle or the second electric vehicle, a tractive force generated by the first electric vehicle or the second electric vehicle, or a braking force generated by the first electric vehicle or the second electric vehicle.

Optionally, the vehicle energy parameter includes a value indicative of one or more of a distance traveled or to be traveled by the first electric vehicle or the second electric vehicle, a speed of the first electric vehicle or the second electric vehicle, or an acceleration of the first electric vehicle or the second electric vehicle.

Optionally, the vehicle energy parameter includes a value indicative of a voltage of an electric supply network that supplies the electric energy to the first electric vehicle or the second electric vehicle.

In one embodiment, an electric vehicle includes an air conditioning system having an actuator configured to produce heat or cold. The vehicle also includes a controller configured to generate an operating command to control the actuator to deliver a first average power over a predetermined time period based on one or more climatic conditions and based on a vehicle energy parameter. The vehicle energy parameter indicates whether (a) the electric vehicle or another electric vehicle is consuming electric energy to propel the electric vehicle or the other electric vehicle or (b) the electric vehicle or the other electric vehicle is producing the electric energy. The controller is configured to generate the operating command such that a second average power delivered by the actuator during the predetermined time period has substantially the same value as when the controller generates the operating command based only on the one or more climatic conditions.

Optionally, while the vehicle energy parameter indicates that the electric vehicle or the other electric vehicle is consuming the electric energy to propel the electric vehicle or the other electric vehicle, the controller is configured to generate the operating command such that a third average power delivered by the actuator during the predetermined time period is less than the second average power delivered by the actuator when the controller generates the operating command based only on the one or more climatic conditions.

Optionally, while the vehicle energy parameter indicates that the electric vehicle or the other electric vehicle is producing the electric energy, the controller is configured to generate the operating command such that a third average power delivered by the actuator is greater than the second average power delivered by the actuator when the controller generates the operating command based only on the one or more climatic conditions.

In one embodiment, a method includes determining one or more climatic conditions associated with a first electric vehicle, determining a vehicle energy parameter that is indicative of whether the first electric vehicle or a second electric vehicle is consuming or producing electric energy from an electrical supply network, and controlling an actuator that produces heat or cold onboard the first electric vehicle to deliver a first average power over a predetermined time period based on the one or more climatic conditions and the vehicle energy parameter. The actuator is controlled such that a second average power delivered by the actuator during the predetermined time period has substantially the same value as when the actuator is controlled based only on the one or more climatic conditions.

Optionally, the method also includes disconnecting the actuator from the electrical supply network that provides the electric energy used by the first electric vehicle or the second electric vehicle. The actuator can be disconnected from the electrical supply network responsive to determining that the first electric vehicle is consuming the electric energy from the electrical supply network.

Optionally, the vehicle energy parameter includes a value indicative of one or more of electrical power consumed by the first electric vehicle or the second electric vehicle, a tractive force generated by the first electric vehicle or the second electric vehicle, a braking force generated by the first electric vehicle or the second electric vehicle, a distance traveled or to be traveled by the first electric vehicle or the second electric vehicle, a speed of the first electric vehicle or the second electric vehicle, or an acceleration of the first electric vehicle or the second electric vehicle.

Optionally, the vehicle energy parameter includes a value indicative of a voltage of an electric supply network that supplies the electric energy to the first electric vehicle or the second electric vehicle.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a controller configured to generate an operating command to control an actuator that cools or heats a first electric vehicle, the controller configured to generate the operating command to control the actuator to deliver a first average power over a predetermined time period based on one or more climatic conditions and based on a vehicle energy parameter, the vehicle energy parameter indicating whether (a) the first electric vehicle or a second electric vehicle is consuming electric energy to propel the first electric vehicle or the second electric vehicle or (b) the first electric vehicle or the second electric vehicle is producing the electric energy, the controller is configured to determine whether the first electric vehicle is consuming the electric energy or producing the electric energy based on an open state or a closed state of a door of the first electric vehicle, the controller configured to generate the operating command such that the first average power delivered by the actuator during the predetermined time period has substantially the same value as a second average power delivered by the actuator when the controller generates the operating command based only on the one or more climatic conditions.

2. The system of claim 1, wherein, while the vehicle energy parameter indicates that the first electric vehicle or the second electric vehicle is consuming the electric energy to propel the first electric vehicle or the second electric vehicle, the controller is configured to generate the operating command such that the first average power delivered by the actuator during the predetermined time period is less than the second average power delivered by the actuator when the controller generates the operating command based only on the one or more climatic conditions.

3. The system of claim 1, wherein, while the vehicle energy parameter indicates that the first electric vehicle or the second electric vehicle is producing the electric energy, the controller is configured to generate the operating command such that the first average power delivered by the actuator is greater than the second average power delivered by the actuator when the controller generates the operating command based only on the one or more climatic conditions.

4. The system of claim 1, wherein the controller is configured to generate a control signal representative of the operating command and for sending to the actuator, the controller configured to modify one or more of an amplitude or a duration of the control signal based on the vehicle energy parameter.

5. The system of claim 1, wherein the controller is configured to generate an intermediate command as a function of the one or more climatic conditions, the controller also configured to modify the intermediate command based on the vehicle energy parameter.

6. The system of claim 1, further comprising an energy storage assembly configured to store the electric energy produced by the first electric vehicle.

7. The system of claim 1, further comprising a load shedding apparatus configured to disconnect the actuator from an electrical supply network that provides the electric energy used by the first electric vehicle or the second electric vehicle, the load shedding apparatus configured to disconnect the actuator from the electrical supply network responsive to the controller determining that the first electric vehicle is consuming the electric energy from the electrical supply network.

8. The system of claim 1, wherein the vehicle energy parameter indicates whether the second electric vehicle is consuming the electric energy.

9. The system of claim 1, wherein the vehicle energy parameter indicates whether the second electric vehicle and at least one additional electric vehicle other than the first electric vehicle are consuming the electric energy.

10. The system of claim 1, wherein the vehicle energy parameter includes a value indicative of one or more of electrical power consumed by the first electric vehicle or the second electric vehicle, a tractive force generated by the first electric vehicle or the second electric vehicle, or a braking force generated by the first electric vehicle or the second electric vehicle.

11. The system of claim 1, wherein the vehicle energy parameter includes a value indicative of one or more of a distance traveled or to be traveled by the first electric vehicle or the second electric vehicle, a speed of the first electric vehicle or the second electric vehicle, or an acceleration of the first electric vehicle or the second electric vehicle.

12. The system of claim 1, wherein the vehicle energy parameter includes a value indicative of a voltage of an electric supply network that supplies the electric energy to the first electric vehicle or the second electric vehicle.

* * * * *